No. 741,718. Patented October 20, 1903.

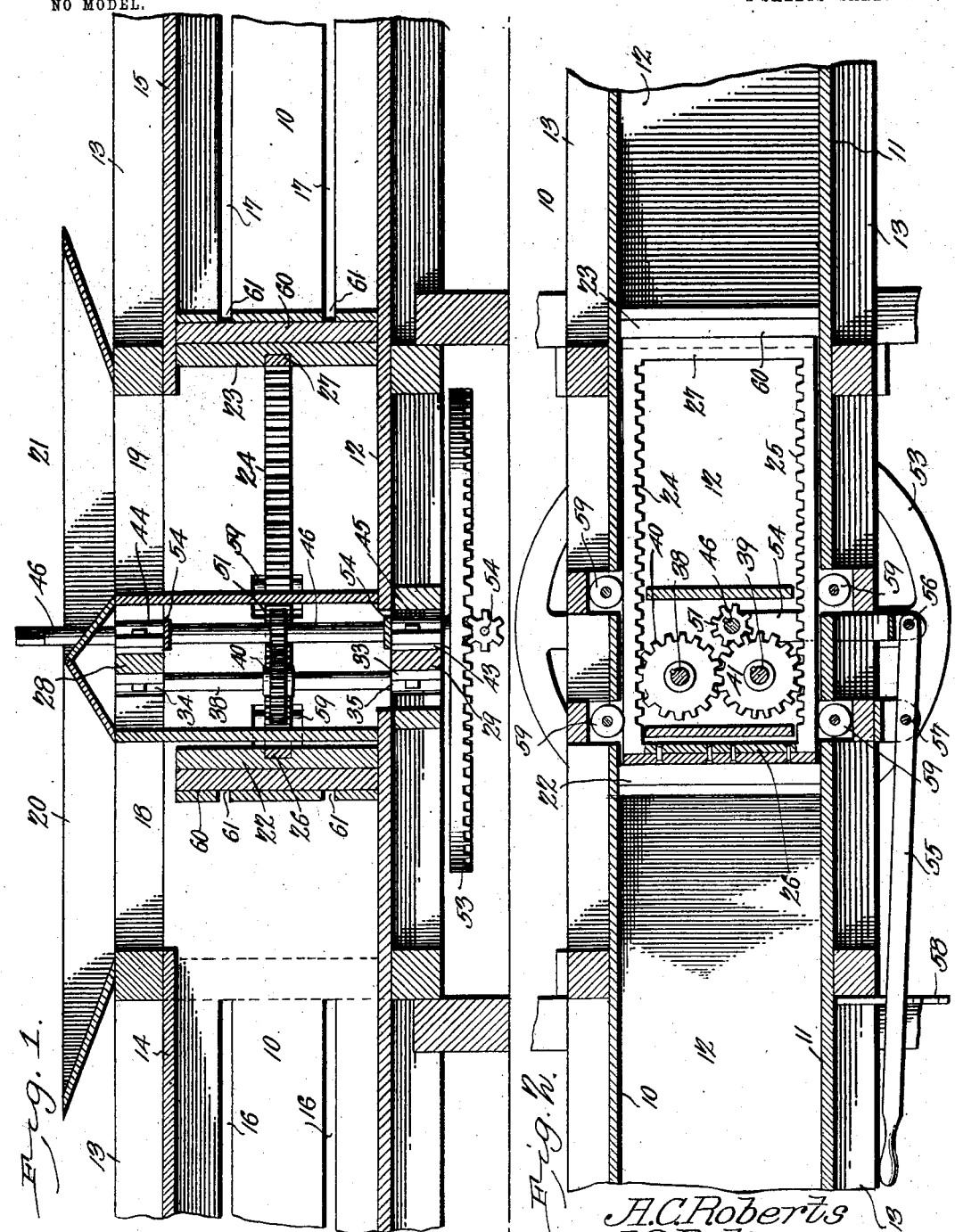

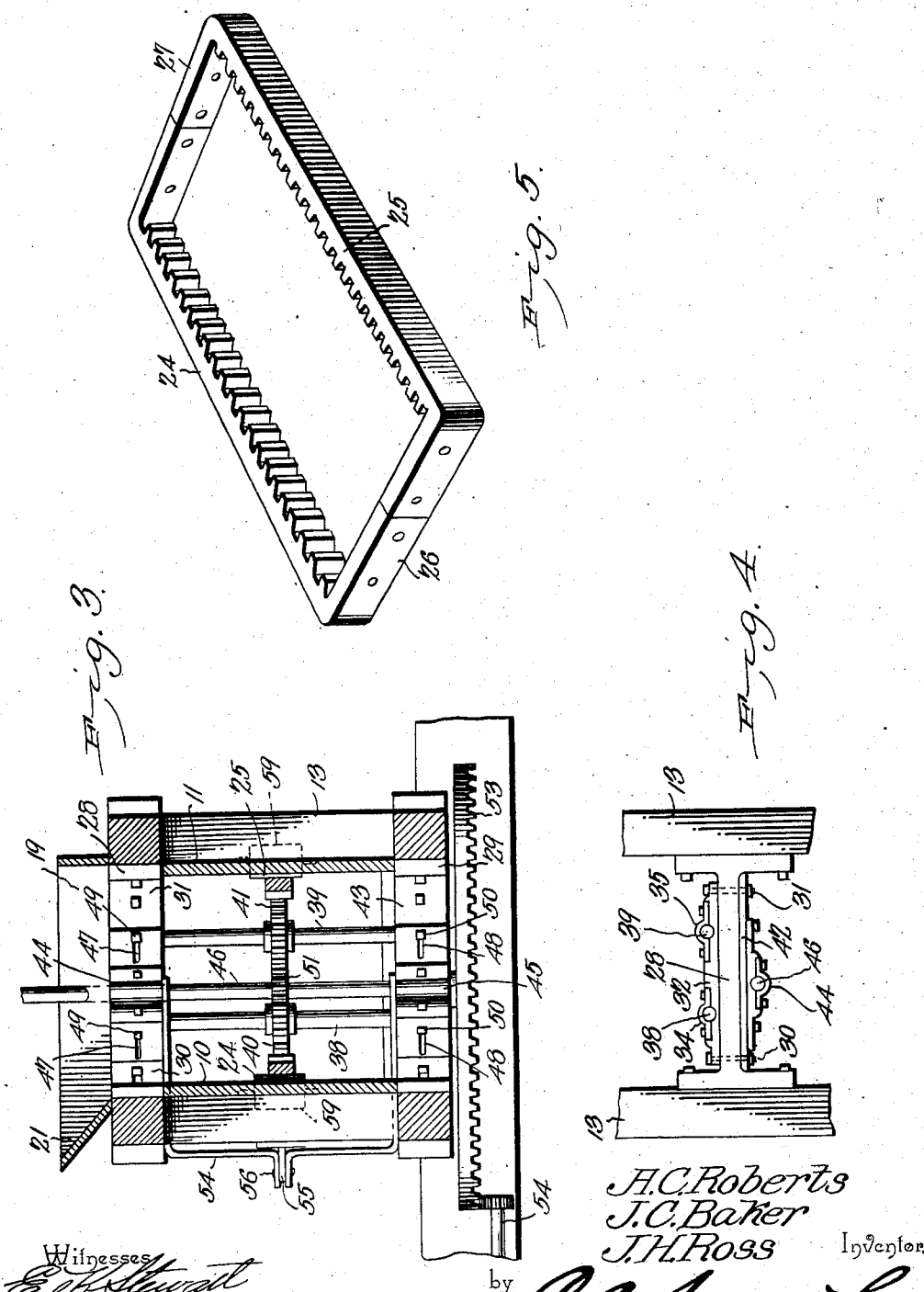

UNITED STATES PATENT OFFICE.

AMEARICUS C. ROBERTS, JEFFERSON C. BAKER, AND JOHN H. ROSS, OF SEARCY, ARKANSAS.

BALING-PRESS.

SPECIFICATION forming part of Letters Patent No. 741,718, dated October 20, 1903.

Application filed June 23, 1903. Serial No. 162,796. (No model.)

*To all whom it may concern:*

Be it known that we, AMEARICUS C. ROBERTS, JEFFERSON C. BAKER, and JOHN H. ROSS, citizens of the United States, residing at Searcy, in the county of White and State of Arkansas, have invented a new and useful Baling-Press, of which the following is a specification.

This invention relates to baling-presses, which may be adapted to compress various products, but which are more particularly applicable to pressing hay and similar products into bales, and has for its object to simplify and improve devices of this character and produce a device wherein two oppositely-disposed press-boxes are employed and provided with alternately-operated plungers, so that while the material in one press-box is being compressed the other box will be receiving its supply of loose material.

The invention consists in certain novel features of construction, as hereinafter shown and described, and specified in the claims.

In the drawings illustrative of the invention, in which corresponding parts are denoted by like designating characters, Figure 1 is a longitudinal sectional elevation. Fig. 2 is a plan view in section on the line 2 2 of Fig. 1. Fig. 3 is a transverse section on the line 3 3 of Fig. 1. Fig. 4 is a detail view of the drive-shaft-adjusting mechanism. Fig. 5 is a perspective view, enlarged, of the plunger-connecting frame.

The improved device consists of oppositely-located press-boxes, preferably formed with a continuous connecting portion of the same area; and to this end the sides 10 11 and bottom 12 will be formed of continuous bars or strips suitably supported by an inclosing frame 13, of any approved construction and of suitable strength.

The press-boxes may be of any desired length and size, according to the material to be compressed and baled, and will be constructed of the usual material and in the usual manner of such devices. The upper portions of the press-boxes will be of the usual bars or strips 14 15, and the side portions 10 11 will be provided with the usual elongated apertures 16 17 for the insertion of the binding-wires.

Between the press-boxes are located the feed-apertures 18 19, preferably supplied with guide-hoppers 20 21, the feed-hoppers being separated centrally of the device to provide for the location of the operating mechanism, as shown.

Mounted for reciprocation in the press-boxes are plungers 22 23, spaced apart and suitably connected, so that they operate alternately in their respective boxes. The connecting means consists of rack-bars, preferably in the form of a yoke comprising two of the rack-bars and connected by their ends between the plungers, the rack-bars indicated at 24 25 and the transverse ends at 26 27, connected, as by bolts, to the rear sides of the plungers 22 23, as shown. Connecting the main upper and lower stringers of the supporting-frame 13, centrally between the hoppers 20 21, are stay-bars 28 29, and connected, as by bolts 30 31, to these stay-bars are base-plates 32 33, having spaced bearings 34 35, in which spaced shafts 38 39 are rotatively mounted, as shown. Rigidly connected to the shafts 38 39 are intermeshing gears 40 41, the gears likewise operatively engaging the teeth of the rack-bars 24 25, as shown. Upon the opposite side of the stay-bars from the base-plates 32 33 are guide-plates 42 43, connected by the same bolts 30 31 which secure the base-plates. Mounted upon the guide-plates 42 43 are bearings 44 45 rotatively carrying a shaft 46, the bearings having slots 47 48, through which clamp-bolts 49 50 pass into the guide-plate, whereby the bearings may be adjusted upon the guide-plates to shift the shaft 46 transversely of the axial lines of the spaced shafts 38 39.

The shaft 46 is provided with a pinion 51, adapted to be alternately engaged with the gears 40 41 as the shaft 46 is shifted, as will be obvious.

The shaft 46 extends both above and below the frame 13 and is provided upon its upper end with means for connecting a sweep, while the lower end beneath the frame will be provided with a "bull-wheel" 53, to which a "tumbling-rod" 54 is attachable in the usual manner. By this means the shaft 46 may be continuously rotated in one direction.

The means employed for shifting the shaft 46 consists of a U-frame 54, connected by its ends to the shaft 46, adjacent to the bearings 44 45, and extending through the side walls of the intermediate section between the press-boxes and connected to an operating-lever 55 at 56, the latter pivoted at 57 to the frame 13 and operating over a notched bar 58, also attached to the frame 13. By this simple means it will be obvious that when the lever 55 is moved in one direction the shaft 46 will be shifted to engage the pinion 51 with one of the gears 40 or 41, and when thrown in the opposite direction the pinion will be engaged with the opposite gear. It will also be obvious that when the pinion 51 is in operative engagement with the gear 40 the rack-bars 24 25, with their attached plungers, will be moved in one direction, and when engaged with the gear 41 the motion will be reversed, and then when the lever is held centrally of the bar 58 the pinion will be held out of engagement with both the gear-wheels. By this means the two plungers may be operated alternately or held stationary, as required, so that the material may be compressed alternately in the press-boxes and every stroke utilized for work. The action will thus be very rapid and no time will be lost during the return strokes of the plungers, as the return stroke of one plunger will be utilized as the forward or operative stroke of the other plunger.

The whole mechanism is very simple and compact, can be cheaply and easily constructed, requires no skilled labor to operate it, and can be adapted to all the various products which are usually compressed into bales.

The side members of the intermediate section between the press-boxes will be provided with spaced bearing-rollers 59, against which the rack-bars 24 25 operate to reduce the friction to a minimum.

The usual follower-heads will be employed, as shown at 60, to divide the bales and provided with the channels 61 to enable the band-wires to be passed around the bales in the ordinary manner.

Any improved feeding means may be employed to supply the material to the hoppers and press-boxes, but as these feeding means form no part of the present invention they are not illustrated.

Any suitable power may be employed for driving the shaft 46, and the invention is not, therefore, to be limited to any specific means for applying power thereto.

In the accompanying drawings are shown the preferable embodiment of the invention, but is not to be limited to the precise construction and proportions of parts therein shown, as it is obvious that various modifications and changes may be made without departing from the principle of the invention or sacrificing any of its advantages.

Having thus described the invention, what we claim is—

1. In a baling-press, the combination of oppositely-located press-boxes having an intermediate feed-opening, reciprocating plungers spaced apart and connected by a gear rack-bar and alternately operative in said press-boxes, intermeshing gears one of which engages said gear-rack, a drive-shaft carrying a gear-pinion and mounted for rotation, and means for shifting said shaft to alternately engage said pinion with said intermeshing gears, to reverse the motion of said plunger, substantially as described.

2. In a baling-press, the combination of oppositely-located press-boxes having an intermediate feed-opening, reciprocating plungers spaced apart and operative alternately in said press-boxes, a connecting means between said plungers consisting of inwardly-facing gear-racks spaced apart, intermeshing gear-wheels engaging said gear-racks, a drive-shaft carrying a pinion, and means whereby said shaft may be shifted to cause said pinion to be alternately engaged with said gears, and reverse the motion of said plungers.

3. In a baling-press, the combination of oppositely-located press-boxes having an intermediate feed-opening, reciprocating plungers spaced apart and operative alternately in said press-boxes, connecting means between said plungers consisting of a yoke-frame having sides formed of spaced gear-racks and connected by its ends to said plungers, spaced shafts mounted for rotation within said yoke-frame, intermeshing gear-teeth carried by said shafts and operatively engaging said gear-racks, a drive-shaft mounted for rotation and carrying a gear-pinion, and means for shifting said shaft to alternately engage said pinion with said gear-wheels, whereby the motion of said yoke-frame and connected plungers is reversed, substantially as described.

4. In a baling-press, the combination of oppositely-located press-boxes having an intermediate feed-opening, reciprocating plungers spaced apart and operative alternately in said press-boxes, a connecting means between said plungers, consisting of spaced gear-racks, supporting-frames transversely disposed upon opposite sides of said connecting means, spaced shafts mounted for rotation upon said frames and carrying intermeshing gears operatively engaging said gear-racks, a drive-shaft mounted for rotation and carrying a gear-pinion, and means whereby said shaft may be shifted to alternately connect said pinion with said intermeshing gears and cause the reversal of the motion of said plungers, substantially as described.

5. In a baling-press, the combination of oppositely-located press-boxes having an intermediate feed-opening, reciprocating plungers spaced apart and operative alternately in said press-boxes, a connecting means between said plungers, consisting of spaced gear-racks, supporting-frames transversely disposed upon opposite sides of said connecting means, spaced shafts mounted for rotation upon said frames and carrying intermeshing gears operatively engaging said gear-racks, bearings mounted for movement transversely of the axial line of said shafts, a drive-shaft mounted for rotation in said bearings, and carrying a pinion, and means for shifting said bearings to cause said pinion to be alternately engaged with said gear-wheels, substantially as described.

6. In a baling-press, the combination of oppositely-located press-boxes having an intermediate feed-opening, reciprocating plungers spaced apart and operative alternately in said press-boxes, a connecting means between said plungers consisting of spaced gear-racks, supporting-frames transversely disposed upon opposite sides of said connecting means, bearings connected to one side of said frames, spaced shafts mounted for rotation in said bearings and carrying intermeshing gears operatively engaging said gear-racks, guide-plates upon the opposite side of said frame from said shaft-bearings, bearings mounted for movement upon said guide-plates transversely of the axial line of said spaced shafts, a drive-shaft mounted for rotation in said movable bearing and carrying a pinion, and means for shifting said movable bearing and the pinion carried thereby, substantially as described.

7. In a baling-press, the combination of oppositely-located press-boxes having an intermediate feed-opening, reciprocating plungers spaced apart and connected by a gear rack-bar and alternately operative in said press-boxes, transversely-disposed supporting-frames, spaced shafts carrying intermeshing gears operatively engaging said rack-bar, and mounted for rotation upon said frames, a drive-shaft mounted for rotation and carrying a gear-pinion, a yoke-frame connected to said drive-shaft, and an operating-lever connected to said yoke-frame whereby by the shifting of said lever said drive-shaft may be correspondingly shifted to engage said pinion alternately with said intermeshing gears to reverse the motion of said plungers, substantially as described.

8. In a baling-press, a continuous press-box having intermediate feed-openings, reciprocating plungers spaced apart and alternately operative in said press-box upon opposite sides of said feed-openings, connecting means between said plungers, consisting of spaced rack-bars, stay-bars connecting the side walls of said press-box intermediately of said feed-openings, spaced shafts mounted for rotation upon said stay-bars and carrying intermeshing gears in operative engagement with said rack-bars, a drive-shaft mounted for rotation and carrying a pinion, and means for adjusting said drive-shaft to cause said pinion to be alternately engaged with said intermeshing gears, to reverse the motion of said plungers, substantially as described.

9. In a baling-press, the combination of oppositely-located press-boxes having an intermediate feed-opening, reciprocating plungers spaced apart and connected by a rack-bar and alternately operative in said press-boxes, stay-bars transversely disposed centrally of said feed-openings, base-plates connected to said stay-bars at one side and having spaced bearings, spaced shafts mounted for rotation in said bearings and carrying intermeshing gears operatively engaging said rack-bars, guide-plates upon the opposite side of said stay-bars from said bearing base-plates and connected thereto by the same bolts which hold the bearing-plates, shaft-bearings movably mounted upon said guide-plates and rotatively supporting a drive-shaft, a pinion upon the drive-shaft, and means for adjusting said drive-shaft to alternately connect said pinion with said intermeshing gears, substantially as described.

10. In a baling-press, a continous press-box having intermediate feed-openings, reciprocating plungers spaced apart and alternately operative in said press-box upon opposite sides of said feed-openings, connecting means between said plungers, formed of rack-bars spaced apart and operating adjacent to the sides of the press-box, bearing-rollers carried by said press-box in engagement with the rear surfaces of said rack-bars, and means whereby said rack-bars and the plungers carried thereby may be alternately reciprocated within said press-boxes, substantially as described.

In testimony that we claim the foregoing as our own we have hereto affixed our signatures in the presence of two witnesses.

AMEARICUS C. ROBERTS.
JEFFERSON C. BAKER.
JOHN H. ROSS.

Witnesses:
R. R. LEWIS,
J. A. CANADA.